United States Patent
Kim et al.

(10) Patent No.: US 8,270,607 B2
(45) Date of Patent: Sep. 18, 2012

(54) METHOD OF PROTECTING BROADCAST FRAME, TERMINAL AUTHENTICATING BROADCAST FRAME, AND ACCESS POINT BROADCASTING BROADCAST FRAME

(75) Inventors: Eun Ah Kim, Seoul (KR); Jeong Hyun Yi, Daejeon (KR); Tae-Chul Jung, Seongnam-si (KR); Alexey Fomin, St. Petersburg (RU); Evgeny Linsky, St. Petersburg (RU); Mikhail Stepanov, St. Petersburg (RU); Sergei Bezzateev, St. Petersburg (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1373 days.

(21) Appl. No.: 11/898,417

(22) Filed: Sep. 12, 2007

(65) Prior Publication Data

US 2008/0159535 A1 Jul. 3, 2008

(30) Foreign Application Priority Data

Dec. 27, 2006 (KR) .................. 10-2006-0135559

(51) Int. Cl.
*H04K 1/00* (2006.01)
(52) U.S. Cl. .......... 380/258; 380/30; 380/270; 370/329; 713/168; 455/3.06
(58) Field of Classification Search ............. 380/30, 380/258, 270; 455/3.06
See application file for complete search history.

(56) References Cited

U.S. PATENT DOCUMENTS

| | | | |
|---|---|---|---|
| 7,392,037 B2* | 6/2008 | Qi et al. ............ | 455/410 |
| 7,464,266 B2* | 12/2008 | Wheeler ............ | 713/168 |
| 7,881,475 B2* | 2/2011 | Sood et al. ............ | 380/272 |
| 7,882,349 B2* | 2/2011 | Cam-Winget et al. ........ | 713/160 |
| 2004/0136339 A1* | 7/2004 | Wentink ............ | 370/329 |
| 2005/0086465 A1 | 4/2005 | Sapkota et al. | |
| 2005/0141498 A1 | 6/2005 | Cam Winget et al. | |
| 2005/0182932 A1* | 8/2005 | Wheeler ............ | 713/168 |
| 2005/0207581 A1 | 9/2005 | Qi et al. | |
| 2006/0262932 A1* | 11/2006 | Sood et al. ............ | 380/272 |
| 2007/0060043 A1* | 3/2007 | Qi et al. ............ | 455/3.02 |
| 2007/0064939 A1* | 3/2007 | Huh et al. ............ | 380/201 |
| 2009/0327736 A1* | 12/2009 | Cam-Winget et al. ........ | 713/181 |

FOREIGN PATENT DOCUMENTS

| | | |
|---|---|---|
| JP | 2004-023736 | 1/2004 |
| KR | 1020040049533 A | 6/2004 |
| KR | 1020050060633 A | 6/2005 |

OTHER PUBLICATIONS

Marcus Wong et al., Broadcast Management Frame Protection, Jan. 15, 2006, Samsung, IEEE 802.11-06/0121r0.*
Marcus Wong et al., Broadcast Management Frame Protection, Mar. 6, 2006, Samsung, IEEE 802.11-06/0121r1.*
Nancy Cam-Winget et al., IEEE P802.11, Wireless LANs, Oct. 28, 2005, IEEE 802.11-y5/1045r0.*

* cited by examiner

*Primary Examiner* — April Shan
(74) *Attorney, Agent, or Firm* — NSIP Law

(57) ABSTRACT

A method of protecting a broadcast frame, the method comprising broadcasting a beacon and a maintenance beacon frame (MBF) from an access point (AP) to a plurality of terminals during a maintenance beacon waiting period (MBWP); and broadcasting broadcast management frames (BMFs) from the AP to the plurality of terminals during a broadcast management frame waiting period (BMFWP), wherein the MBF comprises a BMFs message integrity code (MIC) field including a BMFs MIC calculated from concatenated BMFs to be sent in a current beacon interval.

18 Claims, 13 Drawing Sheets

METHOD OF PROTECTING BROADCAST FRAME, TERMINAL AUTHENTICATING BROADCAST FRAME, AND ACCESS POINT BROADCASTING BROADCAST FRAME

CROSS-REFERENCE TO RELATED APPLICATION

This application claims the benefit under 35 U.S.C. §119(a) of Korean Patent Application No. 10-2006-0135559, filed on Dec. 27, 2006, in the Korean Intellectual Property Office, the entire disclosure of which is hereby incorporated by reference.

BACKGROUND OF THE INVENTION

1. Field of the Invention

The present invention relates to a method of protecting a broadcast frame, a terminal authenticating the broadcast frame, and an access point broadcasting the broadcast frame. More particularly, the present invention relates to a method of protecting a broadcast frame, a terminal authenticating the broadcast frame, and an access point broadcasting the broadcast frame to immediately authenticate a broadcast management frame (BMF) when receiving the BMF without a delay.

2. Description of Related Art

The Institute of Electrical and Electronics Engineers (IEEE) 802.11 is a standard developed by the IEEE. Standards within the 802.11 family include IEEE 802.11, IEEE 802.11a, IEEE 802.11b, and IEEE 802.11i, among others.

Generally, in the IEEE 802.11i standard, a security mechanism for protecting only a data frame has been proposed. Protection of a management frame has not been considered. IEEE 802.11i does not provide authentications of broadcast data frame, while IEEE 802.11i provides full protection of unicast data frames.

FIG. 1 is a diagram illustrating an example of a network which lacks the ability to authenticate a broadcast frame, according to a related art.

An access point (AP) 101 on a network 100 may distribute a group transient key (GTK) to all stations (STA) 102 and 103 on the network 100 while processing. In this embodiment, the stations 102 and 103 may protect a broadcast frame by using the GTK.

However, the stations 102 and 103 may transmit the broadcast frame when impersonating that the stations 102 and 103 are the AP 101, since the stations 102 and 103 may not identify an origin of the broadcast frame.

The broadcast frame, that is, a management frame, is critical in terms of a network function. Accordingly, an authentication of a broadcast management frame (BMF) is required.

To overcome such disadvantage, there is a method of protecting a broadcast frame by using an asymmetric signature algorithm. However, high computational complexity of the algorithm makes the method unsuitable for wireless devices.

Also, a time efficient stream loss-tolerant authentication scheme (TESLA) is another method to overcome such disadvantage. However, according to the TESLA, a receiver may not instantly perform an authentication of BMFs, which causes a delay in the authentication. The TESLA will be described in detail in the detailed description of exemplary embodiments in the present invention.

Accordingly, there is a need for an improved method of protecting a broadcast frame, a terminal authenticating the broadcast frame, and an access point broadcasting the broadcast frame to immediately authenticate a BMF when receiving the BMF without a delay.

SUMMARY OF THE INVENTION

Exemplary embodiments of the present invention address at least the above problems and/or disadvantages and provide at least the advantages described below. Accordingly, an aspect of exemplary embodiments of the present invention is to provide a method of protecting a broadcast frame, a terminal authenticating the broadcast frame, and an access point broadcasting the broadcast frame.

An aspect of exemplary embodiments of the present invention also provides a method of protecting a broadcast frame, a terminal authenticating the broadcast frame, and an access point broadcasting the broadcast frame which provide an authentication of a broadcast management frame (BMF) for protection against an adversary within a network.

An aspect of exemplary embodiments of the present invention also provides a method of protecting a broadcast frame, a terminal authenticating the broadcast frame, and an access point broadcasting the broadcast frame which checks a validity of a key using a symmetric method, and immediately authenticates a BMF when receiving the BMF without a delay.

According to an aspect of exemplary embodiments of the present invention, a method of protecting a broadcast frame is provided, the method comprising broadcasting a beacon and a maintenance beacon frame (MBF) from an access point (AP) to a plurality of terminals during a maintenance beacon waiting period (MBWP), and broadcasting broadcast management frames (BMFs) from the AP to the plurality of terminals during a broadcast management frame waiting period (BMFWP), wherein the MBF comprises a BMFs message integrity code (MIC) field including a BMFs MIC calculated from concatenated BMFs to be sent in a current beacon interval.

According to an aspect of exemplary embodiments of the present invention, the broadcasting of the beacon and the MBF comprises creating the MBF including a previous key field, a beacon MIC field, a BMFs number field indicating a number of BMFs to be sent in the current beacon interval, and the BMFs MIC field; and broadcasting the beacon and the MBF to the plurality of terminals.

According to another aspect of exemplary embodiments of the present invention, the creating comprises including a previous key from a previous beacon interval in the previous key field, calculating the beacon MIC using a current key for the current beacon interval, and including the beacon MIC in the beacon MIC field, including the number of BMFs to be sent in the current beacon interval in the BMFs number field, and including the BMFs MIC, calculated on the concatenation of the BMFs using the current key, in the BMFs MIC field when the number of BMFs is different from 0.

According to still another aspect of exemplary embodiments of the present invention, the method of protecting a broadcast frame at the plurality of terminals, further comprises checking, using a security timer, whether the BMF was received during the BMFWP, checking, using an IGTK, whether the BMFs MIC is valid, increasing the number of the received BMFs, comparing the number of the received BMFs with a value included in a BMFs number field of the MBF saved in a buffer, and authenticating the BMF by using the BMFs MIC when the number of the received BMFs is equal to the value.

According to another aspect of exemplary embodiments of the present invention, a terminal which authenticates a broadcast frame is provided, the terminal comprising a security timer for checking a receipt time of a beacon, an MBF, and BMFs which are received from an AP for a time synchronization and a validity check, an MBF processing unit for verifying a validity of the MBF received from the AP, and storing the MBF, a BMF authentication unit for verifying a validity of the BMFs received from the AP, and authenticating the BMFs by using the MBF, wherein the terminal receives the beacon and the MBF during an MBWP of a beacon interval, and receives the BMFs during a BMFWP of the beacon interval.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

Figure 1:
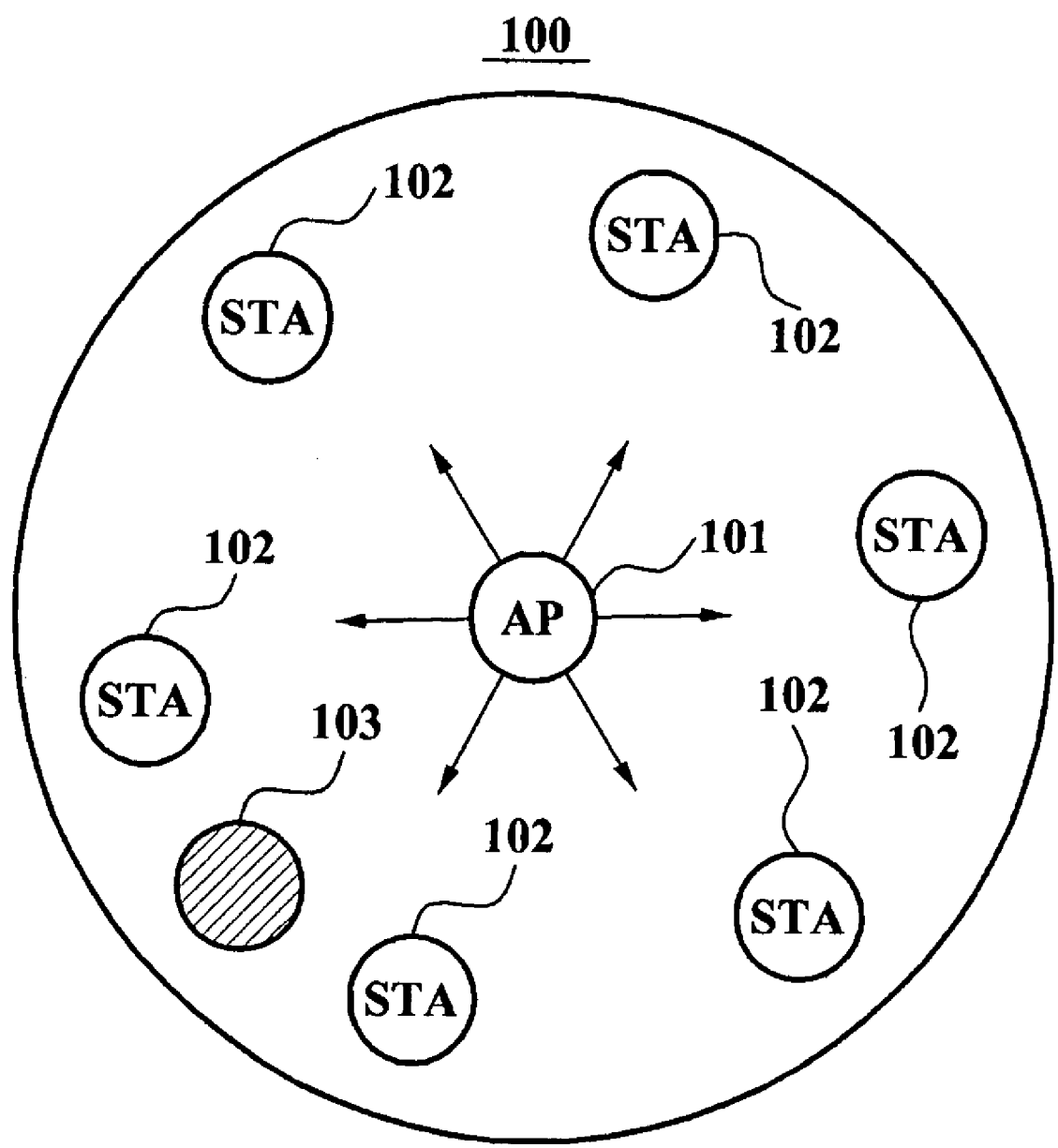
FIG. 1 is a diagram illustrating an example of a network which lacks the ability to authenticate a broadcast frame according to a related art.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

I. Background

In a time efficient stream loss-tolerant authentication (TESLA) scheme, a sender generates a key chain $\{K_0, \ldots, K_n\}$. Here, $K_i$ is calculated by $K_i=Hi(RAND)=(H(\ldots H(RAND)))$, where RAND indicates a random number $(K_n)$, and H(RAND) indicates a one-way hash function. For example, $K_0$ may be calculated as $K_0=H(K_1)=H(h(K_2))$. Here, H(RAND) publishes a verification key $K_0$.

Also, a broadcast message M, sent in a period j, is protected using a key $K_j$ in a following way: $M \rightarrow j\|K_j-1\|M\|MIC(K_j, j\|K_j-1\|M)$. The broadcast message M may be verified only after receiving another broadcast message M' sent in a period j+1.

Specifically, since the broadcast message M' includes the key $K_j$, a receiver may verify the key $K_j$ and the broadcast message M using $M \rightarrow j\|Kj-1\|M\|MIC(Kj, j\|Kj-1\|M)$ after receiving the broadcast message M'. As an example, the receiver may verify the $K_j$ by using $K_0=H(H(\ldots(H(K_j))\ldots))$ or $K_{j-1}=H(K_j)$ and a message integrity code (MIC) in the broadcast message M using the key $K_j$.

Accordingly, when the verification of the MIC and the key are all successful, a message is authenticated and trusted.

However, according to the TESLA scheme, the receiver may not instantly perform the authentication at a point in time when the broadcast frame is received from the sender. Thus, according to the TESLA scheme, a delay between a reception and the authentication of the broadcast frame may occur.

II. A Method of Protecting a Broadcast Frame, a Terminal Authenticating the Broadcast Frame, and an Access Point Broadcasting the Broadcast Frame According to an Exemplary Embodiment of the Present Invention To provide broadcast management frames (BMFs) with authentication, the BMFs should be sent by using an insider protection protocol (IPP).

The IPP provides data integrity and replay protection using an advanced encryption standard (AES)-128 in a cell-structured cipher-based message authentication code (CMAC) mode. The AES, a symmetric key cryptography announced by National Institute of Standards and Technology (NIST), is expected to be used worldwide as was a data encryption standard (DES). Also, all IPP processing uses AES with a 128-bit block size and a key size is selectable from 128/192/256 bits.

In the IPP, a beacon interval may be divided into two successive parts. During a first part, referred to as a maintenance beacon waiting period (MBWP), a beacon and a maintenance beacon frame (MBF) are transmitted. During a second part, referred to as a BMF waiting period (BMFWP), the BMFs are transmitted.

To compute a message integrity code (MIC) of the BMFs, the IPP may use a new key $K_i$ for each beacon interval. These keys form a hash chain, that is, $K_{i-1}$=Truncate-128(SHA-256 $(K_i)$). Here, $K_0$ is referred to as an initial group temporal key (IGTK), and an authenticator, that is, an access point (AP) distributes the IGTK and an IGTK sequence number whenever the authenticator distributes a new GTK. The IGTK is identified by a MAC address of a station transmitting with the IGTK and a non-zero 13-bit key identifier that is encoded in a management MIC information element (MMIE) key identification (ID) field.

BMFs protection may be implemented in the following way. The MIC, derived from the concatenation of all BMFs which will be transmitted during a current beacon interval, is calculated. In this instance, the obtained MIC is placed in the MBF. A key used for the MIC calculation is placed in the BMFs.

The BMFs protection is achieved since the BMFs may not be created without an injection of an MBF with an appropriate MIC. However, the MBF may not be injected since the appropriate key is not open during the MBWP.

Also, the IPP requires that each station knows what period of time the MBWP or the BMFWP is currently running. This requires that time information transmitted in a beacon was protected. For this purpose, the MIC for the beacon, which was calculated using the key for the current beacon interval, is added to the MBF.

Figure 2:
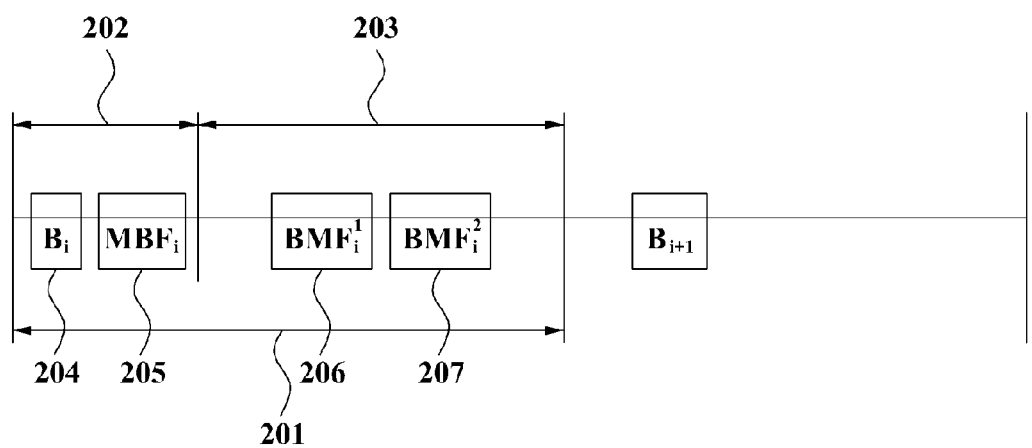
FIG. 2 is a diagram illustrating an example of a maintenance beacon waiting period (MBWP) and a broadcast management frame waiting period (BMFWP) according to an embodiment of the present invention.

FIG. 2 is a diagram illustrating an example of an MBWP and a BMFWP according to an embodiment of the present invention.

As described above, a beacon interval 201 may be divided into an MBWP 202 and a BMFWP 203.

A beacon 204 and an MBF 205 are broadcasted during the MBWP 202. A start point of the MBWP 202 is determined as a nominal beacon transmission time.

The duration of the MBWP 202 is calculated as a sum of following times: a maximum delay before a transmission of the beacon 204, a Point Coordination Function (PCF) interframe space (PIFS), a maximum length beacon transmission time, a short inter-frame space (SIFS), and a transmission time of the MBF 205.

Also, the maximum delay before the transmission of the beacon 204 is determined as a sum of following times: a time needed to transmit a request-to-send (RTS), a clear-to-send (CTS), a management protocol data unit (MPDU) of a maximum length, an acknowledge (ACK), and three SIFS.

The BMFWP 203 starts after the MBWP 202 finishes, and continues until the end of the beacon interval 201. BMFs 206 and 207 are broadcasted during the BMFWP 203.

Figure 3:
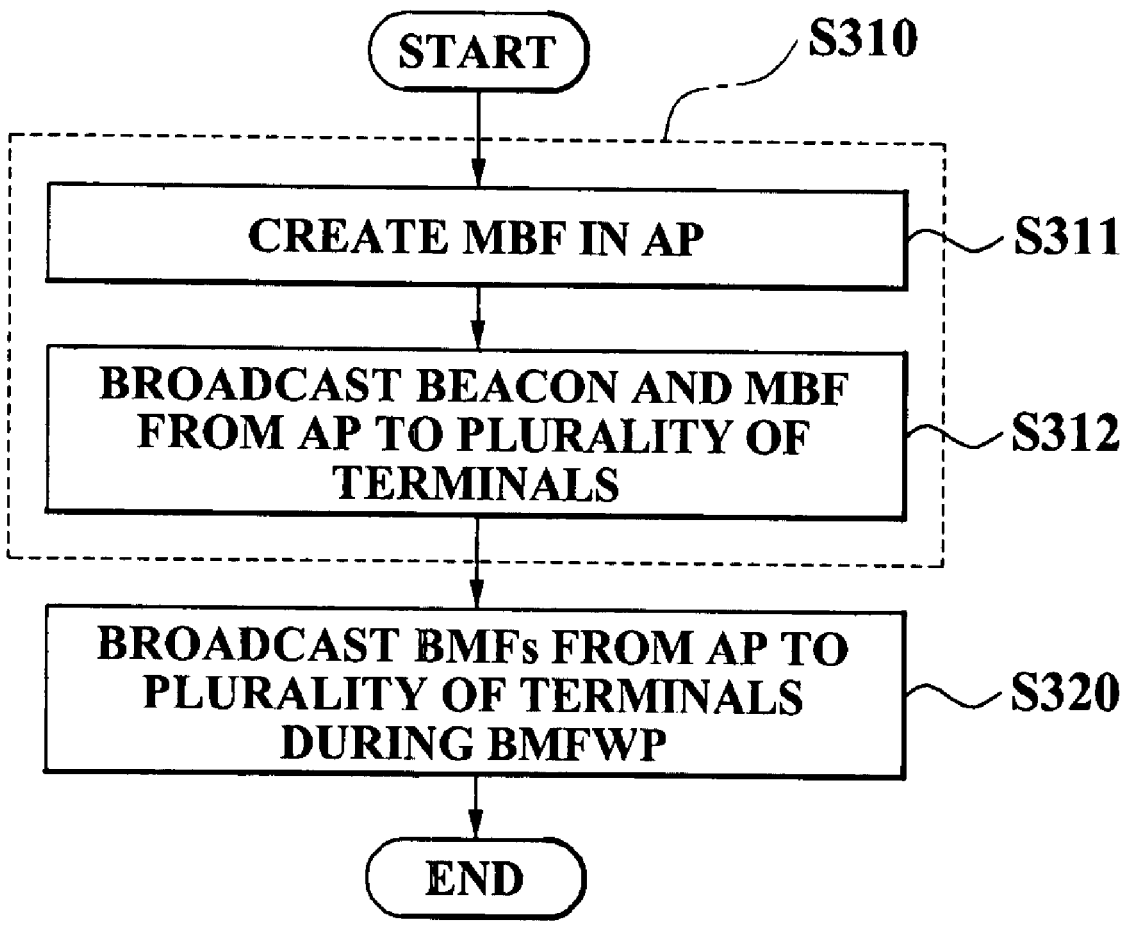
FIG. 3 is a flowchart illustrating a method of protecting a broadcast frame according to an embodiment of the present invention.

FIG. 3 is a flowchart illustrating a method of protecting a broadcast frame according to an embodiment of the present invention.

In operation S310, an AP broadcasts a beacon and an MBF to a plurality of terminals during an MBWP. The beacon may be used for time synchronization on a network. The MBF may include a BMFs MIC field, including a BMFs MIC calculated from concatenated BMFs, to be sent in a current beacon interval.

In an exemplary embodiment of the present invention, the AP may perform operation S310, and operation S310 may include creating the MBF in operation S311 and broadcasting the MBF to the plurality of terminals in operation S312. The MBF includes a previous key field, a beacon MIC field, a BMFs number field indicating the number of BMFs to be sent in a current beacon interval, and a BMFs MIC field. A method of creating the MBF in operation S311 will be described in detail with reference to FIGS. 5 and 6.

In operation S320, the AP broadcasts BMFs to the plurality of terminals during a BMFWP. In an exemplary embodiment of the present invention, the BMFs may include a current key used for a calculation of the MIC.

Figure 4:
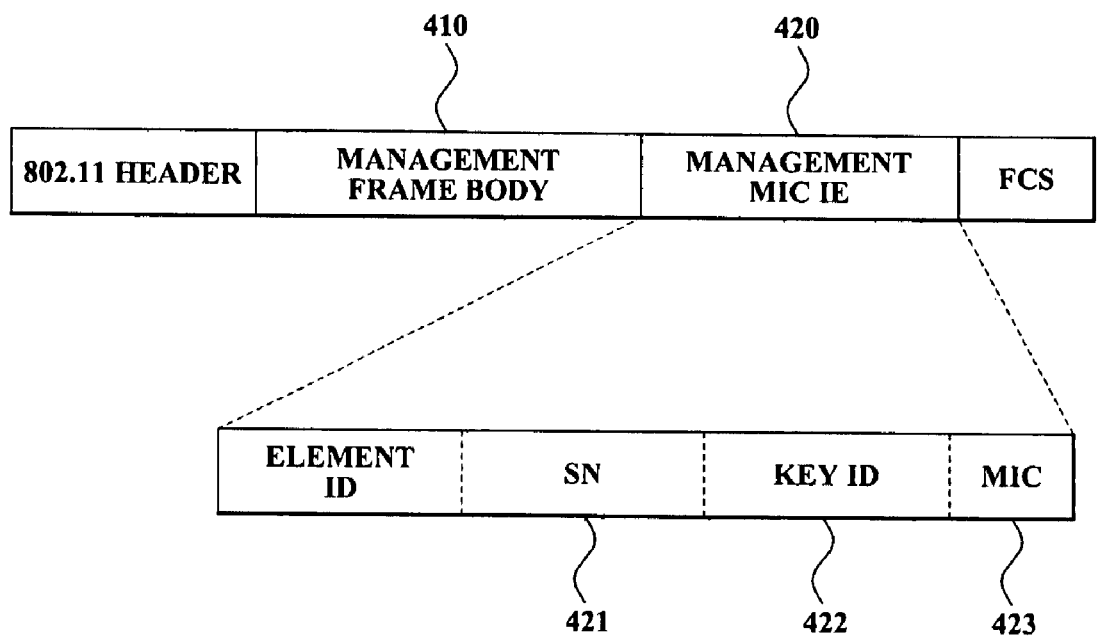
FIG. 4 is a diagram illustrating an example of a broadcast management frame (BMF) format according to an embodiment of the present invention.

FIG. 4 is a diagram illustrating an example of a BMF format 400 according to an embodiment of the present invention.

The BMF format 400 may include a 802.11 header field, a management frame body field 410, an MMIE field 420, and a frame check sequence (FCS) field.

The management frame body field 410 may include a content of a message to be transmitted. An MMIE in the MMIE field 420 may protect the BMFs from forgery, and provide a data origin authenticity.

The MMIE field 420 may include an element identification (ID), a sequence number (SN) 421, a key ID 422, and an MIC 423.

Also, the SN 421 is interpreted as a 48-bit unsigned integer and used as a sequence number. The key ID 422 includes a current key used to compute the MIC 423.

In an embodiment of the present invention, bits 0-11 of the key ID 422 may define a value in a range from 0 to 4095. Bits 12, 13, 14, and 15 of the key ID 422 are reserved and set to 0 on transmit and ignored on receipt. By convention, a current IGTK may use 0 as a value of the key ID.

The MIC 423 may include a MIC calculated over a management frame.

Figure 5:
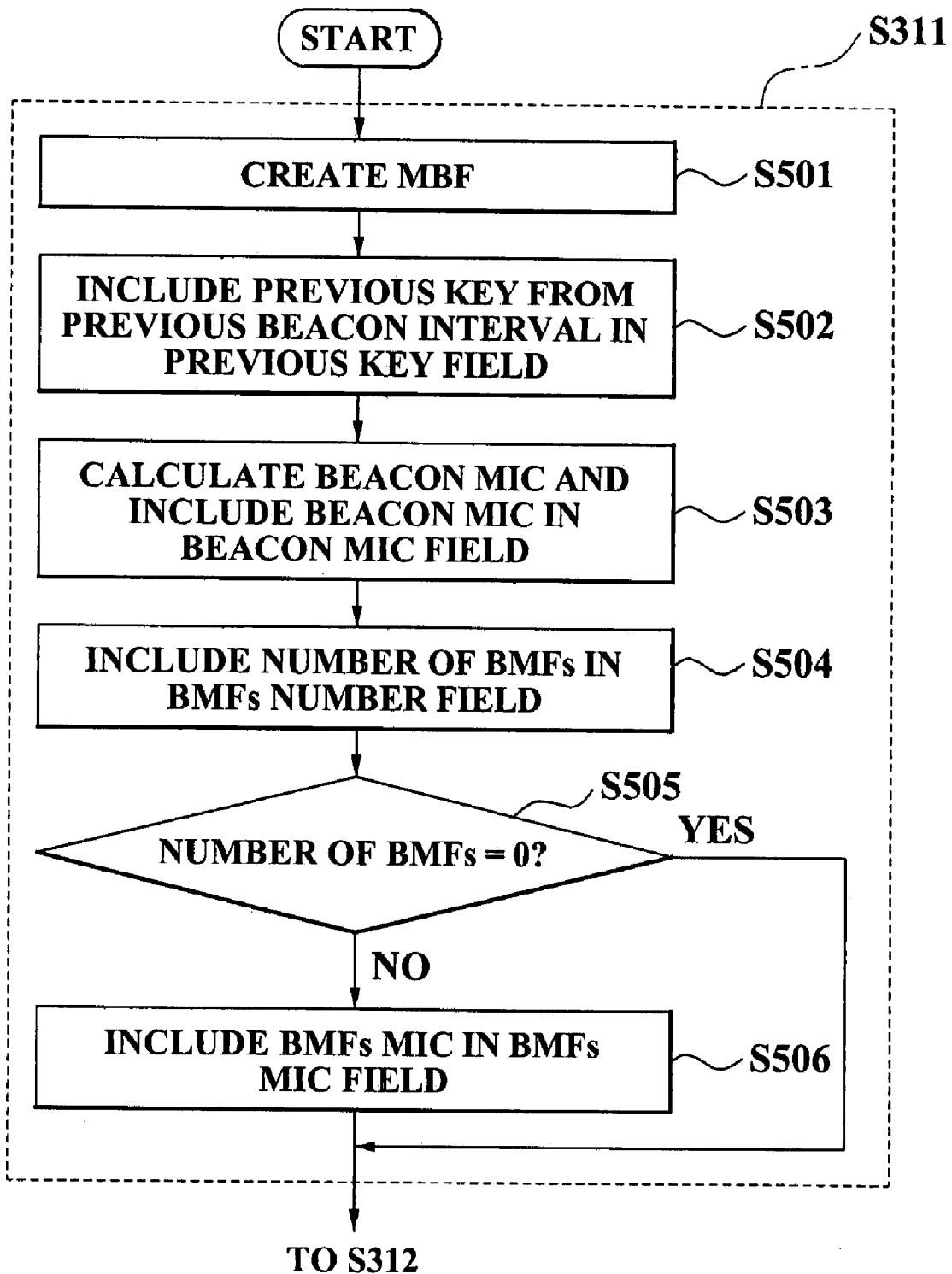
FIG. 5 is a flowchart illustrating a method of creating a maintenance beacon frame (MBF) according to an embodiment of the present invention.

FIG. 5 is a flowchart illustrating a method of creating a maintenance beacon frame (MBF) according to an embodiment of the present invention. As illustrated in FIG. 5, operation S501 through operation S506 may be performed in operation S311.

In operation S501, the AP creates the MBF. The MBF may include the previous key field, the beacon MIC field, the BMFs number field indicating the number of BMFs to be sent in the current beacon interval, and the BMFs MIC field.

In operation S502, the AP includes a previous key from a previous beacon interval in the previous key field. The AP calculates a plurality of keys which is used at every beacon interval in accordance with $K_{i-1}$=Truncate-128(SHA-256 $(K_i)$). Here, $K_0$, which is referred to as an IGTK, is used as a public key. Truncate-128(.) returns the left-most 128 bits of the public key's argument and SHA-256(.) returns SHA-256 digest of the public key's argument.

Specifically, in operation S502, the AP may include the previous key, which corresponds to the previous beacon interval from among the plurality of keys, in the previous key field.

In operation S502, the previous key is used to perform time synchronization in the terminal receiving the MBF. Specifically, when performing the time synchronization using a beacon, the beacon is not protected. Accordingly, a counterfeit beacon may be transmitted to the AP and the plurality of terminals where an attacker is desynchronized, or may be injected using a key from a valid beacon. To prevent the above, the AP performs operation S504.

In operation S503, the AP calculates a beacon MIC using a current key for the current beacon interval and includes the beacon MIC in the beacon MIC field. Specifically, through operation S503, the beacon may be verified via the MBF transmitted subsequent to the beacon.

In operation S504, the AP includes the number of BMFs to be sent in the current beacon interval in the BMFs number field. The number of BMFs may be used to check the MBF corresponding to the BMFs in the terminal receiving the BMFs and the MBF.

In operation S506, the AP includes the BMFs MIC, calculated from a concatenation of the BMFs using the current key, in the BMFs MIC field when the number of BMFs is different from 0, as determined in operation S505. The BMFs MIC may be used to authenticate the BMFs in the terminal receiving the BMFs and the MBF.

Figure 6:
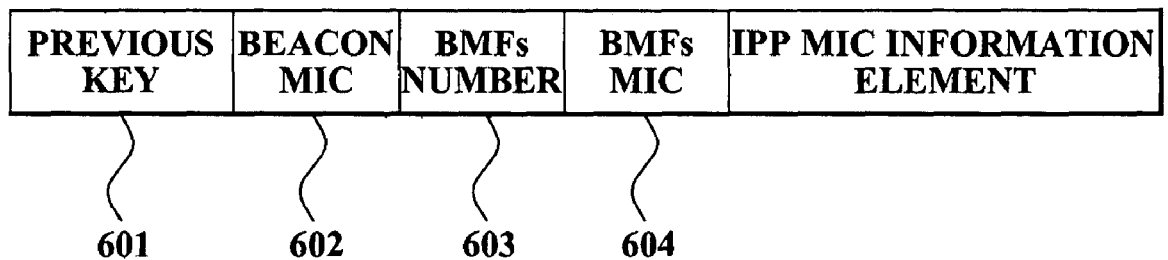
FIG. 6 is a diagram illustrating an example of an MBF format according to an embodiment of the present invention.

FIG. 6 is a diagram illustrating an example of an MBF format according to an embodiment of the present invention. As illustrated in FIG. 6, an MBF format 600 may include a previous key field 601, a beacon MIC field 602, a BMFs number field 603, and a BMFs MIC field 604.

The previous key field 601 may include a previous key used in a previous beacon interval. In an exemplary embodiment of the present invention, a length of the previous key field 601 is 16 octets. The beacon MIC field 602 may include an MIC calculated over a beacon frame.

Also, the BMFs number field 603 is used to indicate to a station the number of BMFs which will be sent in the current beacon interval. A length of the BMFs Number field is 1 octet. The BMFs MIC field 604 may include an MIC calculated from concatenated BMFs, which will be sent in the current beacon interval.

Figure 7:
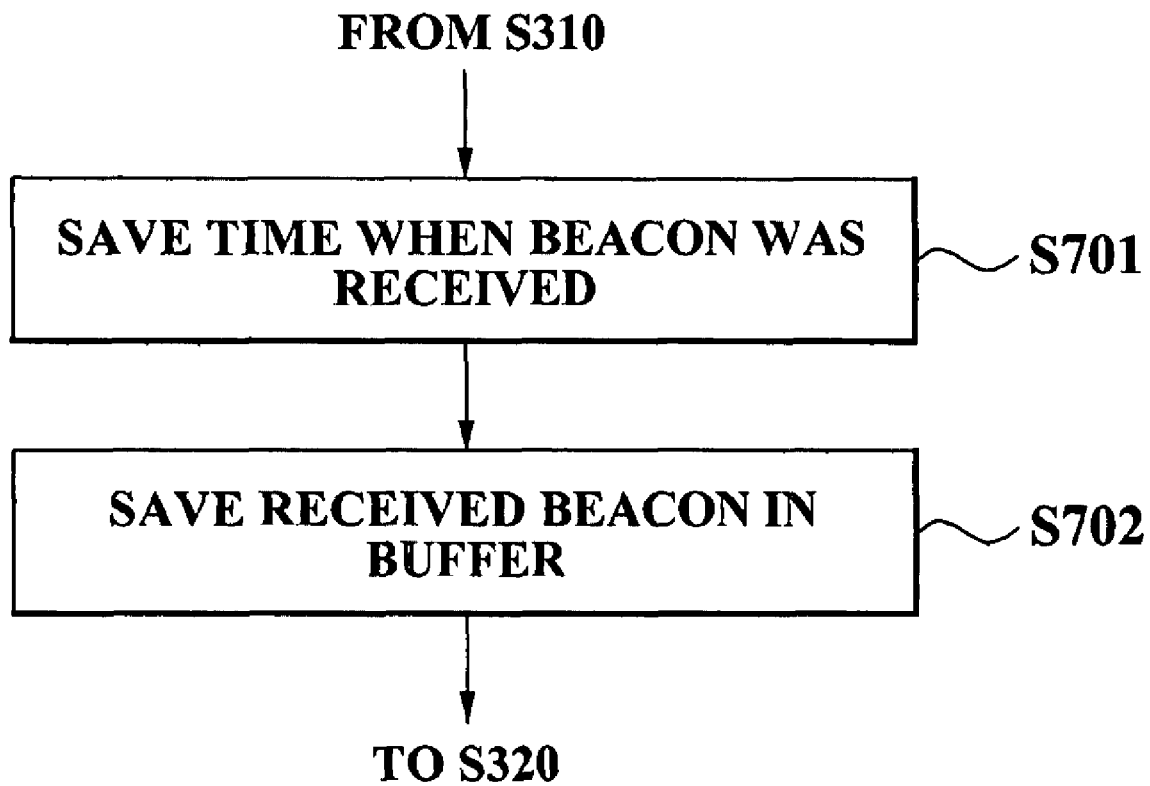
FIG. 7 is a flowchart illustrating a method of processing a beacon in a terminal receiving the beacon according to an embodiment of the present invention.

FIG. 7 is a flowchart illustrating a method of processing a beacon in a terminal receiving the beacon according to an embodiment of the present invention. As illustrated in FIG. 7, operation S701 and operation S702 may be performed between operation S310 and operation S320 in FIG. 3.

In operation S701, the terminal receiving the beacon saves the time when the beacon was received using a security timer. The security timer is used for the time synchronization described in FIG. 5. Specifically, the security timer may be used to check whether the MBF or the BMFs are received during the MBWP or the BMFWP, or to assign a key corresponding to a beacon interval.

In operation S702, the terminal saves the received beacon into a buffer. Accordingly, the terminal receiving the MBF and the beacon is authenticated through a beacon MIC of the beacon included in the MBF.

Figure 8:
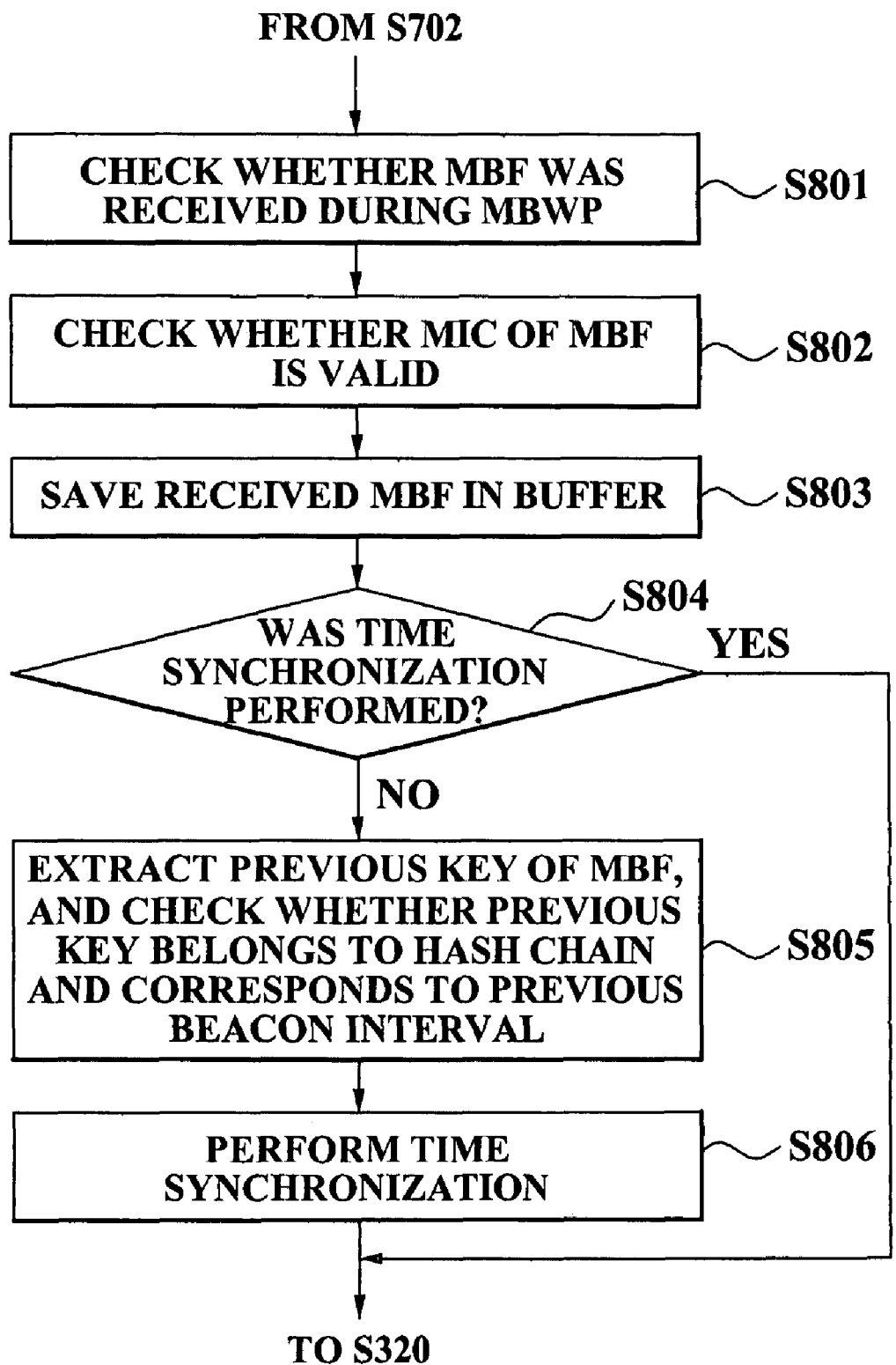
FIG. 8 is a flowchart illustrating a method of processing an MBF in a terminal receiving the MBF according to an embodiment of the present invention.

FIG. 8 is a flowchart illustrating a method of processing an MBF in a terminal receiving the MBF according to an embodiment of the present invention. As illustrated in FIG. 8, operation S801 through operation S806 may be performed between operation S702 in FIG. 7 and operation S320 in FIG. 3.

In operation S801, the terminal checks whether the MBF was received during the MBWP using the security timer. Specifically, as described above, the plurality of terminals may respectively include the security timer, and whether the MBF was received during the MBWP may be checked.

In operation S802, the terminal checks whether the MIC of the MBF is valid by using the IGTK. Specifically, the MIC of the MBF may be verified by using a disclosed previous key included in the previous key field of the MBF.

In operation S803, the terminal saves the received MBF into the buffer. Specifically, the saved MBF may be used to authenticate the BMFs. The authentication of the BMFs may be performed using the BMFs MIC included in the MBF, which is described in detail with reference to FIG. 9 and FIG. 10.

In operation S804, the terminal checks whether the time synchronization was performed during the previous beacon interval. In an exemplary embodiment of the present invention, the time synchronization should result in the AP and the plurality of terminals matching with the MBWP and the BMFWP.

In operation S805, when the time synchronization was not performed during the previous beacon interval, the terminal extracts the previous key from the previous key field of the MBF and checks whether the previous key belongs to a hash chain and corresponds to the previous beacon interval. In an exemplary embodiment of the present invention, to verify that a received key $K_i$ is valid, that is, belongs to the hash chain and has a number i, an equation, $K_j=(\text{Truncate-128}(\text{SHA-256}(K_i)))^{i-j}$, is checked.

Here, j is a number of a last received key from a key chain, and $(.)^{i-j}$ refers to i-j recursive executions of a function in brackets. Also, Truncate-128(.) returns the left-most 128 bits of the public key's argument, and SHA-256(.) returns the SHA-256 digest of the public key's argument.

In operation S806, when the time synchronization was performed during the previous beacon interval, the terminal performs the time synchronization. As described above, the time synchronization should result in the AP and the plurality of terminals matching with the MBWP and the BMFWP, and protect the beacon.

Figure 9:
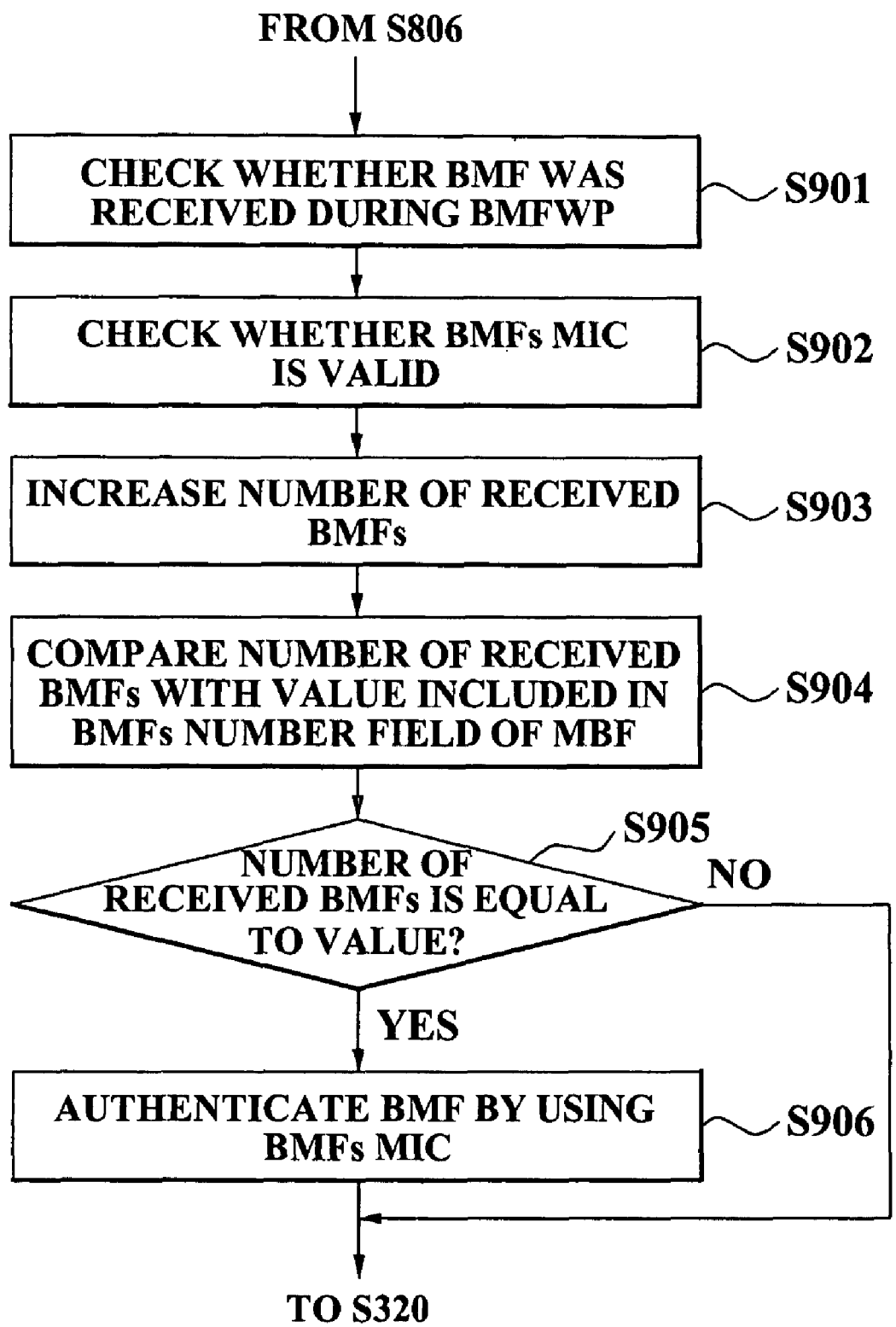
FIG. 9 is a flowchart illustrating a method of authenticating a BMF in a terminal receiving the BMF according to an embodiment of the present invention.

FIG. 9 is a flowchart illustrating a method of authenticating a BMF in a terminal receiving the BMF according to an embodiment of the present invention. As illustrated in FIG. 9, operation S901 through operation S906 may be performed between operation S806 in FIG. 8 and operation S320 in FIG. 3.

In operation S901, the terminal receiving the BMFs checks whether the BMF was received during the BMFWP by using the security timer. In an embodiment of the present invention, the time synchronization may be performed.

In operation S902, the terminal checks whether the BMFs MIC is valid by using the IGTK.

In operation S903, the terminal increases the number of the received BMFs. The number of the received BMFs may be used to retrieve the MBF corresponding to the BMFs for the authentication of the BMFs.

In operation S904, the terminal compares the number of the received BMFs with a value included in a BMFs number field of the MBF saved in the buffer. Specifically, BMFs and an MBF which correspond to each other may be checked through the number of the received BMFs and the value.

When the number of the received BMFs is equal to the value in operation S905, operation S906 is performed. When the number of the received BMFs is different from the value in operation S905, operation S320 is performed.

In operation S906, when the number of the received BMFs is equal to the value, the terminal authenticates the BMF by using the BMFs MIC, which is described in detail with reference to FIG. 10.

Figure 10:
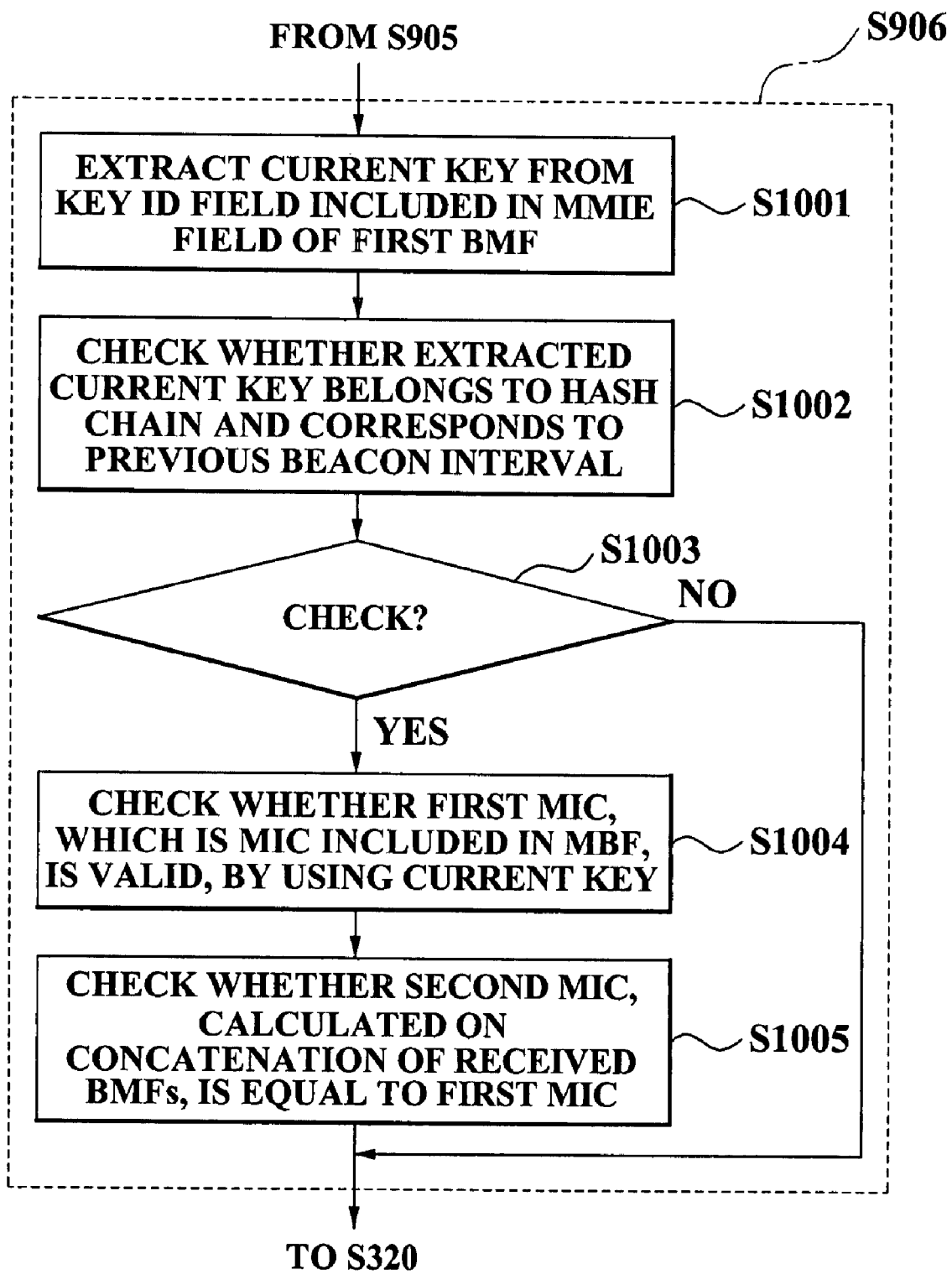
FIG. 10 is a flowchart illustrating a method of performing an authentication of a BMF by using a message integrity code (MIC) according to an embodiment of the present invention.

FIG. 10 is a flowchart illustrating a method of performing an authentication of a BMF by using an MIC according to an embodiment of the present invention. As illustrated in FIG. 10, operation S1001 through operation S1005 may be performed between operation S905 in FIG. 9 and operation S320 in FIG. 3.

In operation S1001, the terminal extracts the previous key of the previous key field of the MBF. Specifically, through operation S904 in FIG. 9, the MBF corresponding to the BMFs may be retrieved, and the terminal may obtain the previous key.

In operation S1002, the terminal checks whether the previous key belongs to the hash chain and corresponds to the previous beacon interval. In an embodiment of the present invention, the beacon MIC in the beacon MIC field may be authenticated using a current key and the time synchronization may be performed using the security timer and beacon information associated with the MBF.

In operation S1003, when the previous key belongs to the hash chain and corresponds to the previous beacon interval, operation S1004 is performed. When the previous key does not belong to the hash chain and correspond to the previous beacon interval, operation S320 is performed.

In operation S1004, when the previous key belongs to the hash chain and corresponds to the previous beacon interval, the terminal checks whether a first MIC, which is the MIC included in the MBF, is valid, by using the current key.

In operation S1005, the terminal checks whether a second MIC, calculated from the concatenation of received BMFs, is equal to the first MIC. Specifically, the terminal checks whether the first MIC, included in the BMFs MIC by using the current key, is equal to the second MIC, calculated in the terminal. Accordingly, the BMFs, that is, a broadcast frame may be authenticated.

According to a method of protecting a broadcast frame, the authentication of the BMFs may be provided for a protection against an internal adversary, and only symmetric method is used. Also, when receiving the broadcast frame, the broadcast frame may be immediately authenticated.

Figure 11:
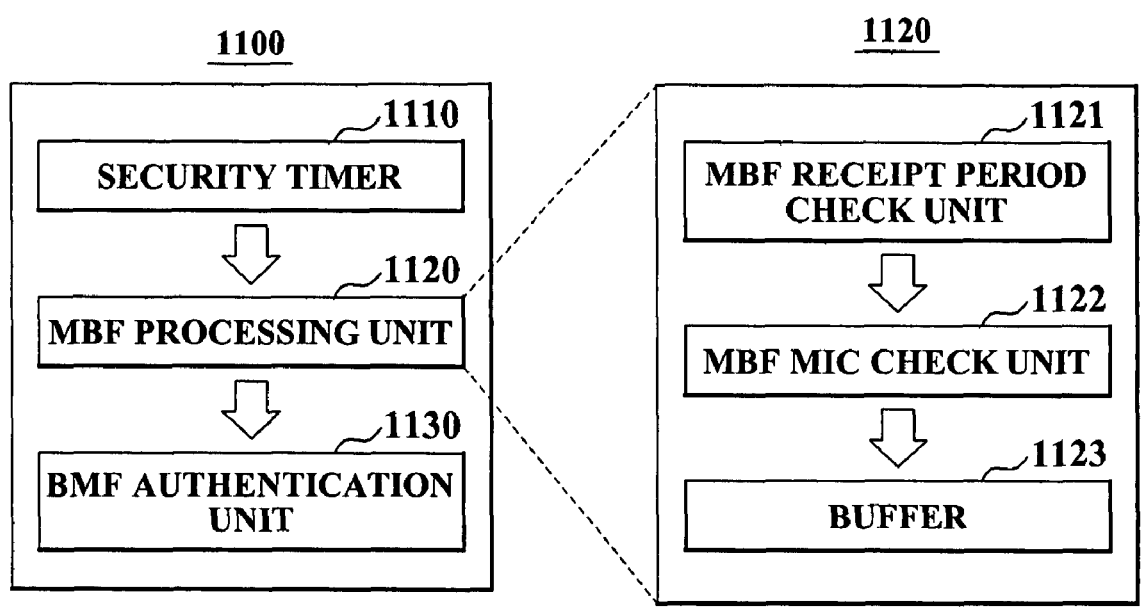
FIG. 11 is a block diagram illustrating a configuration of a terminal authenticating a broadcast frame according to another embodiment of the present invention.

FIG. 11 is a block diagram illustrating a configuration of a terminal 1100 authenticating a broadcast frame according to another embodiment of the present invention. As illustrated in FIG. 11, the terminal 1100 includes a security timer 1110, an MBF processing unit 1120, and a BMF authentication unit 1130. In an embodiment of the present invention, the terminal 1100 receives a beacon and an MBF during an MBWP, and BMFs during a BMFWP.

The security timer 1110 checks a receipt time of a beacon, an MBF, and BMFs which are received from an AP for a time synchronization and a validity check. Specifically, the security timer 1110 checks whether the beacon, the MBF, and the BMFs are received during the MBWP and the BMFWP. Also, the security timer 1110 may be used to assign a key corresponding to the beacon interval.

The MBF processing unit 1120 verifies a validity of the MBF received from the AP and stores the MBF. In an embodiment of the present invention, the MBF processing unit 1120 may include an MBF receipt period check unit 1121, an MBF MIC check unit 1122, and a buffer 1123 used to verify the validity of the MBF.

The MBF receipt period check unit 1121 checks whether the MBF was received during the MBWP by using the security timer 1110.

The MBF MIC check unit 1122 checks an MIC of the MBF by using an IGTK. In an embodiment of the present invention, the AP calculates a plurality of keys which is used at every beacon interval in accordance with an equation, $K_{i-1}$=Truncate-128(SHA-256($K_i$)).

The buffer 1123 stores an MBF where the MIC of the MBF is checked. An authentication of the BMFs received in the terminal 1100 may be performed.

The BMF authentication unit 1130 verifies a validity of the BMFs, which are received from the AP, and authenticates the BMFs by using the MBF. The BMF authentication unit 1130 is described in detail with reference to FIG. 12.

Also, the terminal 1100 may further include a key validity verification unit which is not illustrated. The key validity verification unit verifies a key validity of a plurality of keys in accordance with an equation, $K_j$=(Truncate-128(SHA-256 ($K_i$)))$^{i-j}$. Here, j is a number of a last received key from a key chain and $(.)^{i-j}$ refers to i-j recursive executions of a function in brackets.

Figure 12:
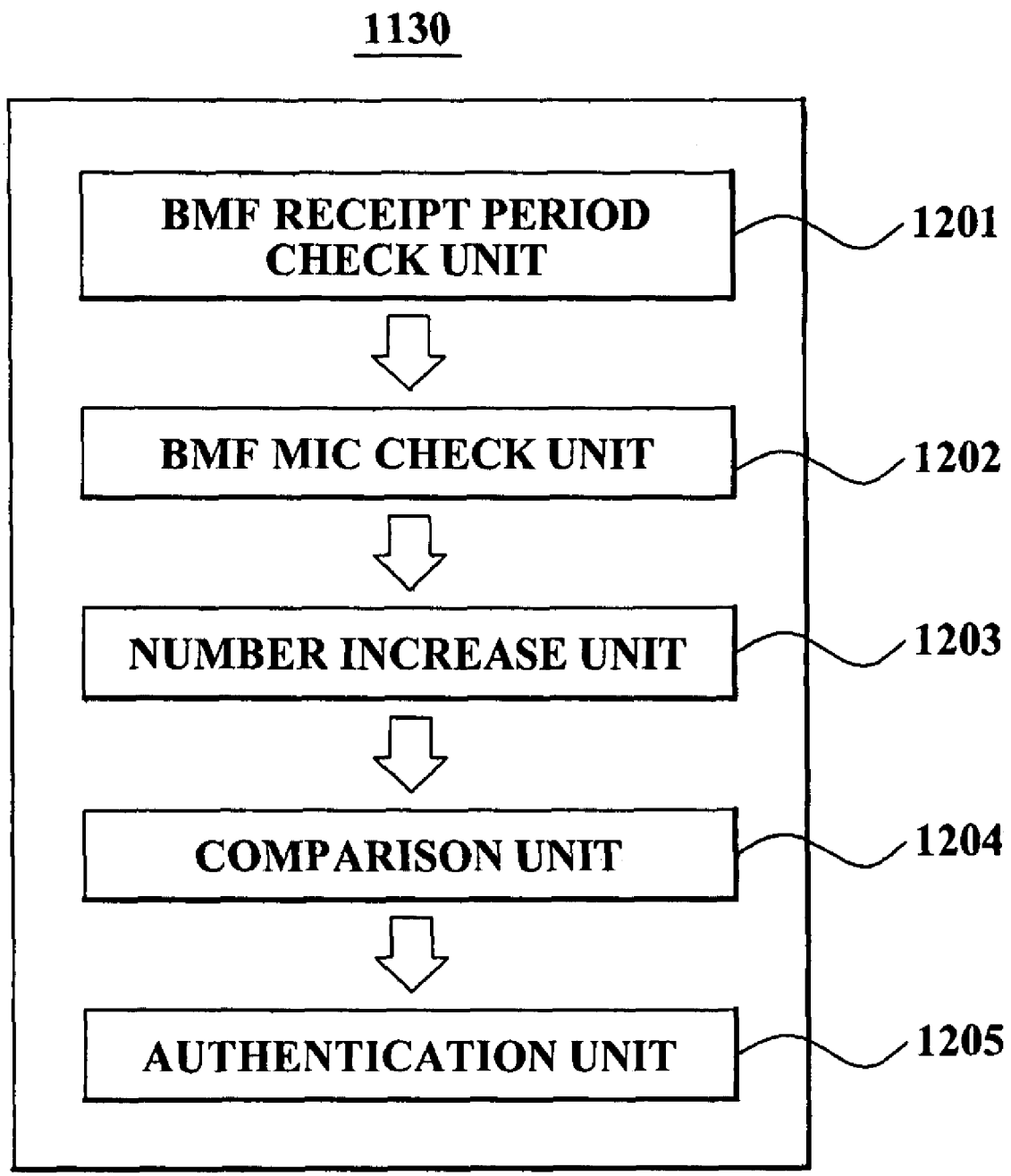
FIG. 12 is a block diagram illustrating a configuration of a BMF authentication unit of FIG. 11 according to another embodiment of the present invention.

FIG. 12 is a block diagram illustrating a configuration of the BMF authentication unit 1130 of FIG. 11 according to another embodiment of the present invention. As illustrated in FIG. 12, the BMF authentication unit 1130 may include a BMF receipt period check unit 1201, a BMF MIC check unit 1202, a number increase unit 1203, a comparison unit 1204, and an authentication unit 1205.

The BMF receipt period check unit 1201 checks whether the BMF was received during the BMFWP by using the security timer 1110 of FIG. 11. Specifically, the security timer 1110 is used for a time synchronization as described above, and the time synchronization may be used to check whether the BMFs was received during the BMFWP or the MBF was received during the MBWP.

The BMF MIC check unit 1202 checks whether a BMFs MIC is valid by using an IGTK. The IGTK is a public key which is disclosed in the AP.

The number increase unit 1203 increases a number of the received BMFs. The number of the received BMFs may be used to retrieve the MBF corresponding to the received BMFs.

The comparison unit 1204 compares the number of the received BMFs with a value included in a BMFs number field of the MBF saved in a buffer.

The authentication unit 1205 authenticates the BMF by using the BMFs MIC when the number of the received BMFs is equal to the value. In an embodiment of the present invention, the authentication unit 1205 may include a key extraction unit, a key check unit, a first MIC check unit, and an MIC check unit which are not illustrated. The key extraction unit extracts a current key from a key ID field included in an MMIE field of a first BMF. The key check unit checks whether the extracted current key belongs to a hash chain and corresponds to a previous beacon interval. The first MIC check unit checks whether a first MIC, which is the MIC included in the MBF, is valid by using the current key when checking whether the extracted current key belongs to the hash chain and corresponds to the previous beacon interval. The MIC check unit checks whether a second MIC, calculated from a concatenation of the received BMFs, is equal to the first MIC.

Specifically, it is checked that the first MIC is equal to the second MIC, and thus the BMFs, a broadcast frame, may be authenticated.

According to an exemplary embodiment of the present invention, the terminal which authenticates a broadcast frame may provide an authentication of the BMFs for protection against an adversary within a network, and only symmetric method is used. Also, when receiving the broadcast frame, the broadcast frame may be immediately authenticated.

Figure 13:
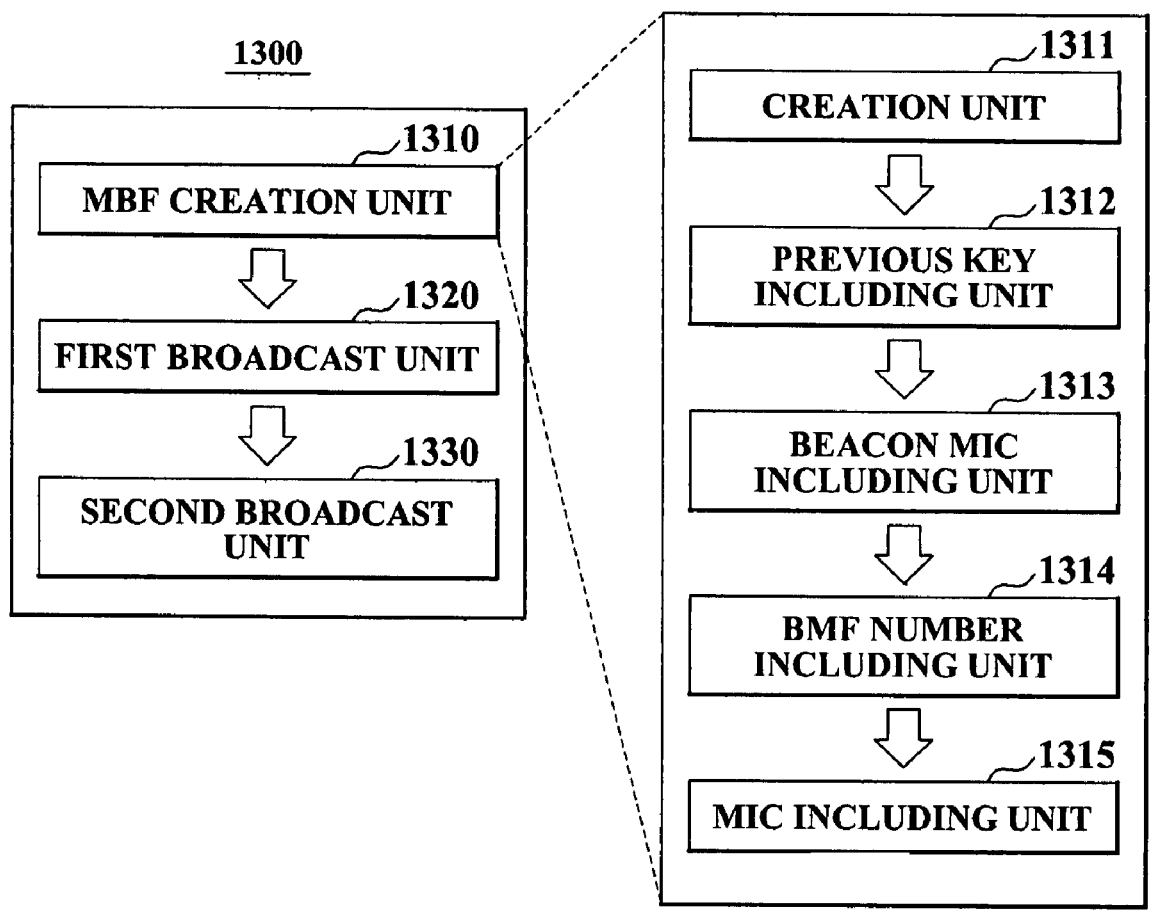
FIG. 13 is a block diagram illustrating a configuration of an access point (AP) broadcasting a broadcast frame according to still another embodiment of the present invention.

FIG. 13 is a block diagram illustrating a configuration of an AP 1300 broadcasting a broadcast frame according to still another embodiment of the present invention. As illustrated in FIG. 13, the AP 1300 includes an MBF creation unit 1310, a first broadcast unit 1320, and a second broadcast unit 1330.

The MBF creation unit 1310 creates an MBF including a previous key field, a beacon MIC field, a BMFs number field indicating the number of BMFs to be sent in a current beacon interval, and a BMFs MIC field. In this embodiment, the MBF may include the BMFs MIC field including a BMFs MIC calculated from concatenated BMFs to be sent in a current beacon interval.

The MBF creation unit 1310 may include a creation unit 1311, a previous key including unit 1312, a beacon MIC including unit 1313, a BMF number including unit 1314, and an MIC including unit 1315. The creation unit 1311 creates the MBF comprising a plurality of fields. The previous key including unit 1312 comprises a previous key from a previous beacon interval in the previous key field. The beacon MIC including unit 1313 calculates a beacon MIC using a current key for the current beacon interval, and includes the beacon MIC in the beacon MIC field. The BMF number including unit 1314 comprises the number of BMFs to be sent in the current beacon interval in the BMFs number field. The MIC including unit 1315 includes the BMFs MIC, calculated from the concatenation of the BMFs using the current key, in the BMFs MIC field when the number of BMFs is different from 0.

Also, the MBF may include a previous key field, a beacon MIC field, a BMFs number field indicating the number of BMFs to be sent in a current beacon interval, and a BMFs MIC field.

The first broadcast unit 1320 broadcasts the MBF from the AP to a plurality of terminals during an MBWP. In an embodiment of the present invention, a terminal receiving the beacon saves a time when the beacon was received using a security timer. Also, the terminal may save the beacon in the buffer to authenticate the beacon.

Also, the terminal receiving the MBF during the MBWP checks whether the MIC of the MBF is valid, and may save the received MBF in the buffer, which may be used to authenticate the BMFs broadcasted by the AP 1300.

The second broadcast unit 1330 broadcasts the BMFs to the plurality of terminals during a BMFWP. The terminal receiving the BMFs during the BMFWP may obtain a current key included in the BMFs, authenticate the BMFs via the MBF corresponding to the BMFs from among the MBF saved in the buffer, and authenticate the beacon by using the current key.

According to an exemplary embodiment of the present invention, an authentication of the BMFs is provided for a protection against an adversary within a network, and only a symmetric method is used. Also, when receiving the broadcast frame, the broadcast frame may be immediately authenticated.

The method of protecting a broadcast frame according to the above-described embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to exemplary embodiments of the present invention, an authentication of BMFs is provided for a protection against an adversary within a network.

Also, according to exemplary embodiments of the present invention, a validity of a key is checked using a symmetric method, and a broadcast frame may be immediately authenticated when receiving the broadcast frame.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of protecting a broadcast frame, the method comprising:
 broadcasting a beacon and a maintenance beacon frame (MBF) from an access point (AP) to a plurality of terminals during a maintenance beacon waiting period (MBWP);
 broadcasting broadcast management frames (BMFs) from the AP to the plurality of terminals during a broadcast management frame waiting period (BMFWP);
 checking whether a time synchronization is performed during a previous beacon interval; and
 extracting a previous key of a previous key field of the MBF and checking whether the previous key belongs to a hash chain and corresponds to the previous beacon interval when the time synchronization is not performed during the previous beacon interval, wherein the MBF comprises a BMFs message integrity code (MIC) field including a BMFs MIC calculated from concatenated BMFs to be sent in a current beacon interval.

2. The method of claim 1, wherein the broadcasting of the beacon and the MBF comprises:
 creating the MBF including a previous key field, a beacon MIC field, a BMFs number field indicating a number of BMFs to be sent in the current beacon interval, and the BMFs MIC field; and
 broadcasting the beacon and the MBF to the plurality of terminals.

3. The method of claim 2, wherein the creating comprises:
 including a previous key from a previous beacon interval in the previous key field;
 calculating the beacon MIC using a current key for the current beacon interval, and including the beacon MIC in the beacon MIC field;
 including the number of BMFs to be sent in the current beacon interval in the BMFs number field; and
 including the BMFs MIC, calculated from the concatenation of the BMFs using the current key, in the BMFs MIC field when the number of BMFs is different from 0.

4. The method of claim 1, further comprising:
 saving a time when the beacon was received by using a security timer; and
 saving the received beacon into a buffer.

5. The method of claim 1, further comprising:
 checking, using a security timer, whether the MBF was received during the MBWP;
 checking, using an initial group temporal key (IGTK), whether the MIC of the MBF is valid; and
 saving the received MBF into a buffer.

6. The method of claim 5, further comprising:
 performing the time synchronization when the time synchronization was performed during the previous beacon interval.

7. The method of claim 1, further comprising:
checking, using a security timer, whether the BMF was received during the BMFWP;
checking, using an IGTK, whether the BMFs MIC is valid;
increasing the number of the received BMFs;
comparing the number of the received BMFs with a value included in a BMFs number field of the MBF saved in a buffer; and
authenticating the BMF by using the BMFs MIC when the number of the received BMFs is equal to the value.

8. The method of claim 7, wherein the authenticating comprises:
extracting a current key from a key identification (ID) field included in a management MIC information element (MMIE) field of a first BMF;
checking whether the extracted current key belongs to a hash chain and corresponds to a previous beacon interval;
checking whether a first MIC, which is the MIC included in the MBF, is valid by using the current key when the extracted current key belongs to the hash chain and corresponds to the previous beacon interval; and
checking whether a second MIC, calculated on the concatenation of received BMFs, is equal to the first MIC.

9. The method of claim 1, further comprising calculating a plurality of keys which are used at every beacon interval in the AP by using a hash chain in accordance with the equation $K_{i-1}$=Truncate-128(SHA-256($K_i$)), where $K_0$, which is referred to as an IGTK, is used as a public key, Truncate-128(.) returns the left-most 128 bits of the public key's argument, and SHA-256(.) returns the SHA-256 digest of the public key's argument;
wherein a key validity of the plurality of keys is verified in accordance with the equation $K_j$=(Truncate-128(SHA-256($K_i$)))$^{i-j}$, where j is a number of a last received key from a key chain and (.)$^{i-j}$ refers to i-j recursive executions of a function in brackets.

10. A non-transitory computer-readable recording medium storing a program for implementing a method of protecting a broadcast frame, the method comprising:
broadcasting a beacon and an MBF from an AP to a plurality of terminals during an MBWP;
broadcasting BMFs from the AP to the plurality of terminals during a BMFWP;
checking whether a time synchronization is performed during a previous beacon interval; and
extracting a previous key of a previous key field of the MBF and checking whether the previous key belongs to a hash chain and corresponds to the previous beacon interval when the time synchronization is not performed during the previous beacon interval, wherein the MBF comprises a BMFs MIC field including a BMFs MIC calculated from concatenated BMFs to be sent in a current beacon interval.

11. A terminal configured to authenticate a broadcast frame, the terminal comprising:
a security timer of the terminal configured to check a receipt time of a beacon, a maintenance beacon frame (MBF), and beacon and a maintenance beacon frames (BMFs) which are received from an access point (AP) for a time synchronization and a validity check;
an MBF processor of the terminal configured to verify a validity of the MBF received from the AP, and to store the MBF;
a BMF authenticator of the terminal configured to verify a validity of the BMFs received from the AP, and to authenticate the BMFs by using the MBF;
a time synchronization checker of the terminal configured to check whether the time synchronization is performed during a previous beacon interval; and
a key checker of the terminal configured to extract a previous key of a previous key field of the MBF, and to check whether the previous key belongs to a hash chain and corresponds to the previous beacon interval, when it has not been checked whether the time synchronization is performed;
wherein the terminal receives the beacon and the MBF during a maintenance beacon waiting period (MBWP) of a beacon interval, and receives the BMFs during a broadcast management frame waiting period (BMFWP) of the beacon interval.

12. The terminal of claim 11, wherein the MBF processor comprises:
an MBF receipt period checker configured to check whether the MBF was received during the MBWP by using the security timer;
an MBF message integrity code (MIC) checker configured to check an MIC of the MBF by using an IGTK; and
a buffer configured to store an MBF where the MIC of the MBF is checked.

13. The terminal of claim 12, further comprising:
a time synchronization performer of the terminal configured to perform the time synchronization when it has been checked whether the time synchronization was performed.

14. The terminal of claim 11, wherein the BMF authenticator comprises:
a BMF receipt period checker configured to check whether the BMF was received during the BMFWP by using the security timer;
a BMF MIC checker configured to check whether a BMFs MIC is valid by using an IGTK;
a number increase processor configured to increase a number of the received BMFs;
a comparator configured to compare the number of the received BMFs with a value included in a BMFs number field of the MBF saved in a buffer; and
an authenticator configured to authenticate the BMF by using the BMFs MIC when the number of the received BMFs is equal to the value.

15. The terminal of claim 14, wherein the authenticator comprises:
a key extractor configured to extract a current key from a key ID field included in an MMIE field of a first BMF;
a key checker configured to check whether the extracted current key belongs to a hash chain and corresponds to a previous beacon interval;
a first MIC checker configured to check whether a first MIC, which is the MIC included in the MBF, is valid by using the current key when it has been checked whether the extracted current key belongs to the hash chain and corresponds to the previous beacon interval; and
a second MIC checker configured to check whether a second MIC, calculated from a concatenation of the received BMFs, is equal to the first MIC.

16. The terminal of claim 11, wherein the AP is configured to calculate a plurality of keys which are used at every beacon interval in accordance with the equation $K_{i-1}$=Truncate-128(SHA-256($K_i$)), where $K_0$, which is referred to as an IGTK, is used as a public key, Truncate-128(.) returns the left-most 128 bits of its argument, and SHA-256(.) returns the SHA-256 digest of its argument; and
the terminal further comprises a key validity verification processor of the terminal configured to verify a key validity of the plurality of keys in accordance with the equation $K_j=(\text{Truncate-128}(\text{SHA-256}(K_i)))^{i-j}$, where j is a number of a last received key from a key chain and $(.)^{i-j}$ refers to i-j recursive executions of a function in brackets.

17. An access point (AP) configured to broadcast a broadcast frame, the AP comprising:

a maintenance beacon frame (MBF) processor of the AP configured to create an MBF including a previous key field, a beacon message integrity code (MIC) field, a beacon and a maintenance beacon frames (BMFs) number field indicating the number of BMFs to be sent in a current beacon interval, and a BMFs MIC field;

a first broadcasting processor of the AP configured to broadcast an MBF from the AP to a plurality of terminals during a maintenance beacon waiting period (MBWP); and a second broadcasting processor of the AP configured to broadcast BMFs to the plurality of terminals during a broadcast management frame waiting period (BMFWP), wherein the MBF comprises the BMFs MIC field including a BMFs MIC calculated from concatenated BMFs to be sent in the current beacon interval, and each of the plurality of terminals is configured to check whether a time synchronization is performed in a previous beacon interval, and each of the plurality of terminals is configured to extract a previous key of a previous key field of the MBF, and to check whether the previous key belongs to a hash chain and corresponds to the previous beacon interval, when it has not been checked whether the time synchronization is performed.

18. The AP of claim 17, wherein the MBF processor comprises:

a creation processor configured to create the MBF including a plurality of fields;

a previous key processor configured to include a previous key from the previous beacon interval in the previous key field;

a beacon MIC processor configured to calculate a beacon MIC using a current key for the current beacon interval, and to include the beacon MIC in the beacon MIC field;

a BMF number processor configured to include the number of BMFs to be sent in the current beacon interval in the BMFs number field; and an MIC processor configured to include the BMFs MIC, calculated from the concatenation of the BMFs using the current key, in the BMFs MIC field when the number of BMFs is different from 0.

\* \* \* \* \*